(12) United States Patent
Holz et al.

(10) Patent No.: US 9,507,442 B2
(45) Date of Patent: Nov. 29, 2016

(54) MULTI-FUNCTION STYLUS FOR MOTION CAPTURE AND SENSORY BASED MACHINE CONTROL

(71) Applicant: Leap Motion, Inc., San Francisco, CA (US)

(72) Inventors: David Samuel Holz, San Francisco, CA (US); Kevin A. Horowitz, San Francisco, CA (US); Justin Schunick, San Francisco, CA (US)

(73) Assignee: Leap Motion, Inc., San Francisco, CA (US)

( * ) Notice: Subject to any disclaimer, the term of this patent is extended or adjusted under 35 U.S.C. 154(b) by 325 days.

(21) Appl. No.: 14/284,280

(22) Filed: May 21, 2014

(65) Prior Publication Data

US 2015/0338933 A1    Nov. 26, 2015

(51) Int. Cl.
*G06F 3/0354*    (2013.01)
*G06F 3/03*    (2006.01)

(52) U.S. Cl.
CPC ......... *G06F 3/03545* (2013.01); *G06F 3/0304* (2013.01)

(58) Field of Classification Search
CPC .................. G06F 3/0304; G06F 3/03545
See application file for complete search history.

(56) References Cited

U.S. PATENT DOCUMENTS

| | | |
|---|---|---|
| 4,814,552 A | 3/1989 | Stefik et al. |
| 4,845,684 A | 7/1989 | Garwin et al. |
| 5,525,764 A | 6/1996 | Junkins et al. |
| 6,100,538 A | 8/2000 | Ogawa |
| 6,633,051 B1 | 10/2003 | Holloway et al. |
| 8,345,023 B1 | 1/2013 | Drennan et al. |
| 8,405,643 B2 | 3/2013 | Liang |
| 2002/0125324 A1 | 9/2002 | Yavid et al. |
| 2004/0140963 A1* | 7/2004 | Kim ............... G06F 3/0325 345/179 |
| 2005/0156888 A1 | 7/2005 | Xie et al. |
| 2010/0141593 A1 | 6/2010 | Park et al. |
| 2011/0043827 A1 | 2/2011 | McFarland et al. |
| 2013/0027716 A1 | 1/2013 | Melkis et al. |
| 2013/0182902 A1 | 7/2013 | Holz |
| 2014/0232699 A1* | 8/2014 | Viswanathan ...... G06F 3/0386 345/179 |

* cited by examiner

*Primary Examiner* — Latanya Bibbins
(74) *Attorney, Agent, or Firm* — Haynes Beffel & Wolfeld LLP

(57) ABSTRACT

Disclosed are a system and a device including a motion capture device and an input device, hereafter referred to as a stylus, which has additional functionality. The motion capture device detects the motion of the stylus and the detected motion is used as an input to a computer system. The system is able to differentiate identical movements of a stylus as different inputs by varying a detectable property of the stylus. The stylus may exhibit a variable reflective property that is detectable by the motion capture device. The variable reflective property gives the stylus additional functionality with an extended vocabulary. The extended vocabulary includes supplemental information and/or instructions detected by the motion capture device.

23 Claims, 4 Drawing Sheets

MULTI-FUNCTION STYLUS FOR MOTION CAPTURE AND SENSORY BASED MACHINE CONTROL

FIELD OF TECHNOLOGY

The present invention relates in general to a stylus for use in a 3-dimensional space for use as an input for a motion capture device, and a system including a stylus and a motion capture device. In embodiments, the stylus includes portion that exhibits a reflective property that is changed.

BACKGROUND

Motion capture devices are used to detect the motion of objects and use the captured motion as an input to a computer system. Motion capture devices are typically small devices connected to computers and located between a user and a display. Some motion capture devices are located on a surface between a user and the display and detect motion in a 3-dimensional sensing region located above the motion capture device. Motion capture devices may use a combination of cameras, light detectors, and light emitters to detect objects in the sensing region. For example, a motion capture device may include two cameras located a set distance apart and an array of illuminators. The illuminators illuminate an object above the motion capture device and a series of images from each camera are used to determine the location, shape and movement of the object.

Motion capture devices are commonly used to detect gestures in the 3-dimensional sensing area above the motion capture device. For example, a gesture may include a series of specific movements of a user's hand or a stylus that has a specific command in an application associated with it. Motion capture devices are also used to detect motion to control a virtual object such as a cursor. Merely following motion of a user's hand, for example, limits the motion capture system to inputs discernible from the hand and its motions. Rather, it would be advantageous to add tool to hand, such as a stylus for example, and tool detection capabilities to the motion capture device. Accordingly, the device could detect a user pointing to different portions of a display by detecting the movement of a stylus held by the user and move the cursor to the appropriate portion of the display. Unfortunately, however, this scenario fails today because the stylus in this example has such limited functionality, e.g., functionality of the system is limited to the detection of the stylus and its motion. In such a system the motion capture device system does not differentiate two identical movements of a stylus.

SUMMARY

Embodiments are directed toward a system and a device including a motion capture device and an input device, hereafter referred to as a stylus, which has additional functionality. The motion capture device detects the motion of the stylus and the detected motion is used as an input to a computer system. The system is able to differentiate identical movements of a stylus as different inputs by varying a detectable property of the stylus. The stylus may exhibit a variable reflective property that is detectable by the motion capture device. The variable reflective property gives the stylus additional functionality with an extended vocabulary. The extended vocabulary includes supplemental information and/or instructions detected by the motion capture device.

In one embodiment, and by way of example, when the stylus is exhibiting a first reflective property the movements of the stylus can be used as input to move a cursor to underline text, and when the stylus is exhibiting a second reflective property the same movements of the stylus can be used as input to move a cursor to highlight text. In this example, the same movements of the stylus used with the same application execute two different functions based on the detected reflective property of a portion of the stylus. In another example, the stylus is used with a drawing application. When the stylus changes from exhibiting a first reflective property to a second reflective property the motion capture device detects the change and a computer system can interpret this input as a signal to begin drawing a line across the screen according to the position of the tip of the stylus. When the reflective property changes, a motion capture device detects the change and a computer system can interpret this input as a signal to stop the line being drawn on the computer screen. These examples are illustrative of the additional functionality of a stylus with an additional detectable property.

DETAILED DESCRIPTION

Figure 1A:
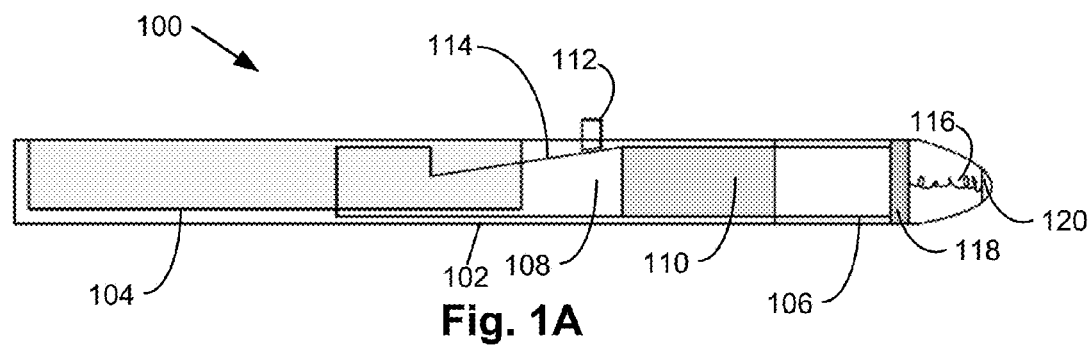
FIG. 1A illustrates a cross sectional view of a first embodiment of a stylus with a moveable element in a first position.

The following description of the invention will typically be with reference to specific structural embodiments and methods. It is to be understood that there is no intention to be limited to the specifically disclosed embodiments and methods but that other features, elements, methods and embodiments may be used for implementation of this disclosure. Preferred embodiments are described to illustrate the technology disclosed, not to limit its scope, which is defined by the claims. Those of ordinary skill in the art will recognize a variety of equivalent variations on the description that follows. Like elements in various embodiments are commonly referred to with like reference numerals.

Embodiments of the disclosed technology relate to devices and methods of conveying information to sensory capable machines capable of detecting objects using sensory input devices such as motion capture devices. The term "stylus" is used to describe an input device which is manipulable by a user and detectable by a motion capture device. The detected motion of the stylus is used as input to a computer. The term "stylus" is not intended to limit the scope of the form or function of an input device. Embodiments of a stylus include combinations of a housing, a reflective surface, a moveable element, and a user interface.

Figure 1B:
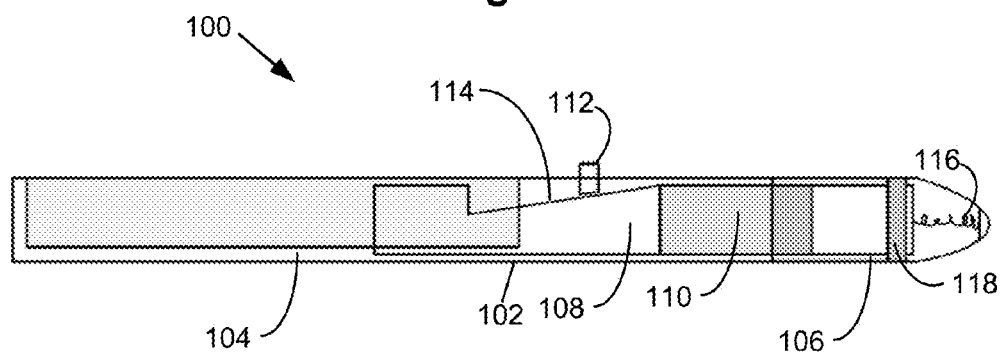
FIG. 1B illustrates a cross sectional view of a first embodiment of a stylus with a moveable element in an intermediate position.
Figure 1C:
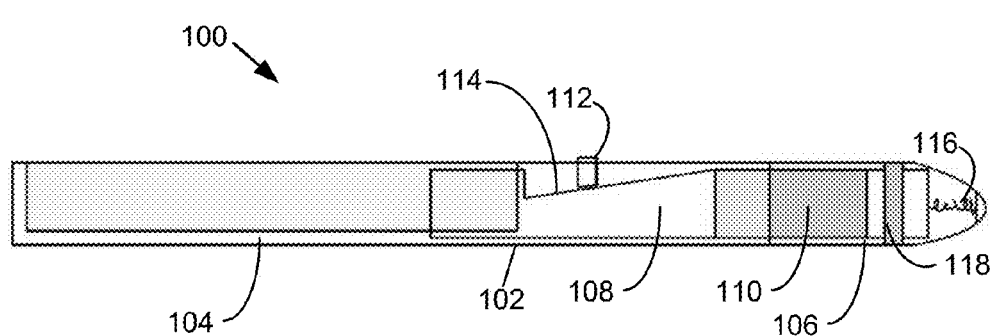
FIG. 1C illustrates a cross sectional view of a first embodiment of a stylus with a moveable element in a second position.

FIGS. 1A-1C illustrate an example stylus 100. The stylus 100 includes a housing 102. The embodiment shown in FIGS. 1A-1C includes a housing 102 that is a straight elongated hollow cylinder. Housing 102 could also have other tubular or tubular-like shapes. Components of the stylus 100 are located within a hollow cavity in the housing 102. In some embodiments, the stylus housing is curved or includes multiple curves or includes a combination of straight and curved sections. In alternative embodiments, the housing may also be in the shape of a cube, a pyramid shape, a sphere, an egg shape, or any form that is able to be held and manipulated by a user. In embodiments, the housing may include features such as an ergonomic hand grip shape or a soft coating to allow a user to comfortably hold the stylus for extended periods of time. The housing may be incorporated into common objects including e.g., pens, capacitive styli for touchscreens, laser pointers, credit cards, Swiss army knives, and similar devices. In embodiments, the housing is in the shape of or includes a representation of a virtual object in a computer application that the input from the stylus is used to control. For example, a stylus being used as an input in a painting application may have the form of a paintbrush including actual bristles on the pointing end or a plastic molded and colored imitation bristle end 204. In embodiments where the stylus has a specific form corresponding with an application, it may be used with the stylus can also be used and function with other applications performing different tasks. Other examples of shapes include a baton, baseball bat, lacrosse stick, jai alai basket, crystal ball and magic wand. These examples of shapes are not intended to be exhaustive but merely illustrative of the envisioned forms that embodiments of the stylus may have.

In FIG. 1A the stylus 100 shown is an embodiment with a first housing portion 104 and a second housing portion 106. Both the first and second housing portions 104, 106 are hollow cylindrical portions. The first housing portion 104 includes walls that are substantially opaque and the second housing portion 106 includes walls that are substantially transparent. In embodiments, first and second housing portion walls have different opacities, and the opacities can range between fully transparent and fully opaque. For example, the first housing portion may have walls that allow 40% of radiation through and the second housing portion may have walls that allow 60% of radiation through. The opacities may be wavelength dependent. The first and second housing portions may be formed of different materials which results in different opacities. The first and second housing portion may also be formed integrally of the same material and the walls of each housing portion may have different opacities due to different wall thicknesses, different wall geometries, fully or semi-reflective coatings, opaque/semi opaque coatings, or any combination thereof. In embodiments, the second body portion can exhibit a lower opacity due to physical openings through the wall. For example, the second housing portion may include a series of round apertures or slots which allow external radiation to enter the hollow cavity without passing through any wall material. The number, size and shape of the openings affect the opacity of the portion of a wall they are located.

In FIGS. 1A-1C the stylus 100 is shown with a moveable element 108 located within the hollow cavity of the housing. The moveable element 108 translates within the housing along a longitudinal axis of the housing. The moveable element translates from a first position where the moveable element is substantially within the first housing portion shown in FIG. 1A, to a second position where at least a portion of the moveable element is in the second housing portion, shown in FIG. 1C. In embodiments, the moveable element may be entirely in the first or second housing portion while in the first or second positions. Alternatively, only portions of the moveable element may be located in the first and second housing portions while located in the first or second position.

In FIGS. 1A-1C the stylus 100 is shown with a reflector 110 attached to, or formed integrally with, the moveable element 108. The reflector 110 is operably coupled to the moveable element 108. The reflector 110 translates with the moveable element 108 between a first position shown in FIG. 1A and second position shown in FIG. 1C. The reflector 110 is substantially within the opaque first housing portion 104 in the first position shown in FIG. 1A. The reflector 110 is substantially within the transparent second portion of the housing 106 when the moveable element 108 is in the second position shown in FIG. 1C. Note however, in the embodiment shown a small portion of the reflector 110 is located in opaque first housing portion 104 when the moveable element 108 is in the second position. In embodiments, reflectors 110 operably coupled to moveable elements 108 may be moved to positions between the first and second positions where a portion of the reflector is located in the first housing portion 104 and a portion of the reflector is located in the second housing portion 106 as is shown in FIG. 1B. In the embodiment shown in FIG. 1A-1C, the second housing portion exhibits a first reflective property when the moveable element is in the first position as shown in FIG. 1A because the reflector 110 is located within the first housing portion 104 and does not contribute to the reflective property exhibited by the second housing portion. The second housing portion exhibits a second reflective property when the moveable element is in the second position as shown in FIG. 1C because the reflector 110 is located within the second housing portion 106 and due to the opacity of the second housing portion 106 the reflector 110 contributes to the reflective property exhibited by the second housing portion. Further, the second housing portion exhibits intermediate reflective properties when the moveable element is located between the first and second position as is shown in FIG. 1B because the reflector 110 is located partially within the first housing portion 104 and partially within the second housing portion 106. The different exhibited reflective properties of the second housing portion are detectable by a motion capture device and give the stylus additional functionality compared to a stylus without a portion that has variable reflective properties.

Figure 2:
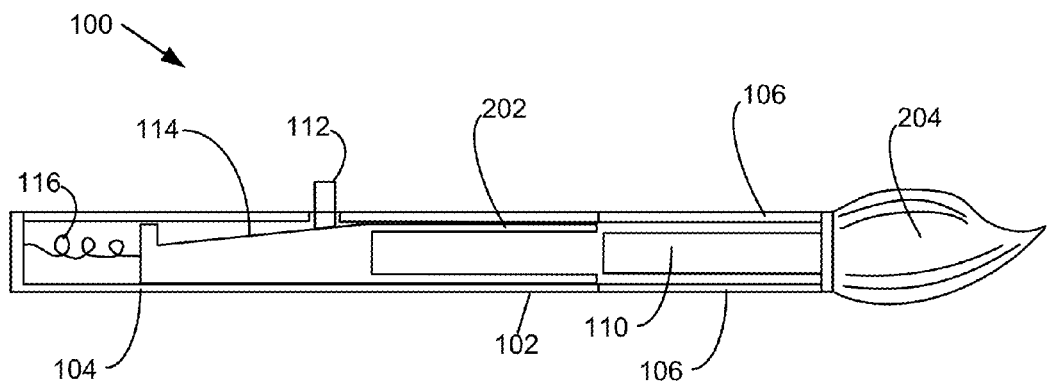
FIG. 2 illustrates a cross sectional view of a second embodiment of a stylus.

FIG. 2 illustrates an alternative embodiment wherein the reflector 110 is fixed to the housing and the moveable element 108 includes a sheath portion 202 to cover or partially cover the reflector 110 while moving between first and second positions. In embodiments, the reflective property of the second housing portion 106 is dependent on the amount the reflector is covered by the moveable element.

Figure 3:
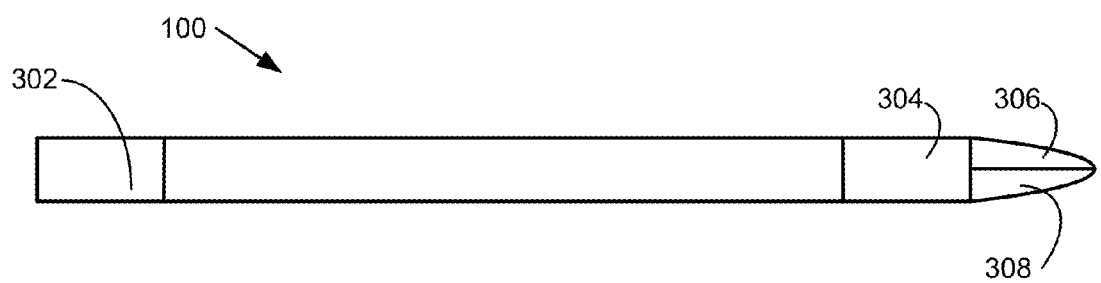
FIG. 3 illustrates a third embodiment of a stylus.

Reflectors include reflective surfaces. Reflective surfaces may reflect a wide spectrum of radiation, for example, visible light. In embodiments, a reflective surface may only effectively reflect radiation within a narrow spectrum or a single wavelength, for example, a specific color of visible light. A reflective surface may reflect infrared radiation, visible light, ultraviolet, or any combination thereof. In embodiments, the reflector is a retro-reflector. In embodiments, a reflective surface has a uniform reflectance. Reflective surfaces may have a pattern of reflectivity or varying reflectivity. A reflector may be composed of a material that is deformable and changes a reflective property when deformed. In FIG. 1A-1C, the stylus 100 includes an additional reflective surface in the form of a reflective strip 118 located proximal to the second housing portion 106. In embodiments, in addition to the reflective surface of the reflector, the housing includes one or more reflective surfaces. In embodiments, a stylus does not include a reflector within the housing, but does include one or more reflective surfaces on the surface of the housing. FIG. 3 illustrates a stylus 100 including additional reflective surfaces 302, 304, 306, and 308.

In embodiments, the reflective properties of different reflective surfaces of a stylus are the same. In other embodiments, the reflective properties of different reflective surface of a stylus are different. For example, the reflective surfaces may reflect radiation with different properties in the same way or in different ways or may reflect radiation with similar properties in the same way, or in a different way. In embodiments, a reflective surface may have a pattern that is detectable by a motion capture device. The detected pattern may be used to uniquely identify a stylus. For example, when two styluses are used simultaneously the input from both styli is detectable as being from the individual stylus based on the unique pattern. A further example includes a user changing the stylus used and a motion capture device detecting that a different stylus is being used. In embodiments, a stylus may have a reflective surface that a user may select the pattern of in order for a system to identify the stylus or identify a specific function for the stylus. A pattern may be composed of a plurality of sub patterns. A pattern of a reflective surface may indicate the portion of the stylus that the pattern is located. For example, a stylus in the shape of a sphere may have a different pattern on each hemisphere. In another example, a stylus in the form of a cylinder may have a different pattern on either end. Further, in this example, the top and bottom of an end may have a different pattern and a motion capture device detect the stylus is able to determine the rotational orientation of the stylus along the longitudinal axis. In these examples the exhibited reflective property of a stylus is changed by orienting the stylus in different ways relative to the motion capture device. In doing so identical movements of a stylus can be given different functions in an application based on using the detected orientation of the stylus as additional input during the detected movement by a motion capture device.

In embodiments, the stylus 100 includes a mechanism operably coupled to, or integral with, the moveable element to move the moveable element between a first and second position. In FIGS. 1A-1C, the embodiment shown includes a mechanism including a push button 112, an inclined plane 114 and a biasing device. In the embodiment shown, the biasing device is a spring 116. In embodiments, the biasing device includes any device used to store energy in tension or compression and may be formed integrally or separate from the housing or moving element. In the embodiment shown in FIG. 1A-1C, the spring 116 is operably coupled to the housing and the moveable element 108 to exert a force to bias the moveable element 108 toward the first position. In some embodiments, no biasing device is used. FIG. 1A shows the reflector 110 located substantially within the opaque first housing portion 104 and the spring 116 being relatively uncompressed. In the embodiment shown, the push button 112 includes a portion external to the housing and a portion internal to the housing. The internal portion of the push button 112 is operably coupled to the inclined plane 114 of the moveable element 108. In operation when the push button is depressed the interaction between the push button and the inclined plane causes a force to be exerted on the moveable element which causes translation toward the second position. This movement of the moveable element is opposed by force from the biasing element. In the embodiment shown in FIG. 1A-1C, the spring is compressed as the moveable element 108 translates from the first position shown in FIG. 1A to an intermediate position shown in FIG. 1B to the second position shown in FIG. 1C. The force exerted on the moveable element by the biasing element is proportional to the location of the moveable element. For the moveable element to remain at a position within the housing, the force exerted on the moveable element by the push button in the direction of translation must be equal to the force of the biasing element to have a net force of zero along the longitudinal axis. Therefore, in embodiments, the position of the moveable element is "touch sensitive" due to the force and/or pressure exerted on the push button by a user corresponding to the position of the moveable element. For example, in the embodiment shown in FIG. 1A-1C, if pressure on the push button is reduced or eliminated the moveable element translates toward the first position due to the biasing force of the spring. In embodiments, other mechanisms may be used to cause the moveable element to move according to the push button including gears, cables, and cam followers.

In embodiments, when a push button is depressed the moveable element moves from a first position to a second position and returns to the first position prior to the push button being released. This feature gives a user a clicking sensation when actuating the push button. In an embodiment, a motion capture device detects the brief change in exhibited reflective property of a portion of the housing of the stylus and an application uses this input as a click input, for example, to select an object a cursor controlled by the stylus is pointing to.

Figure 4:
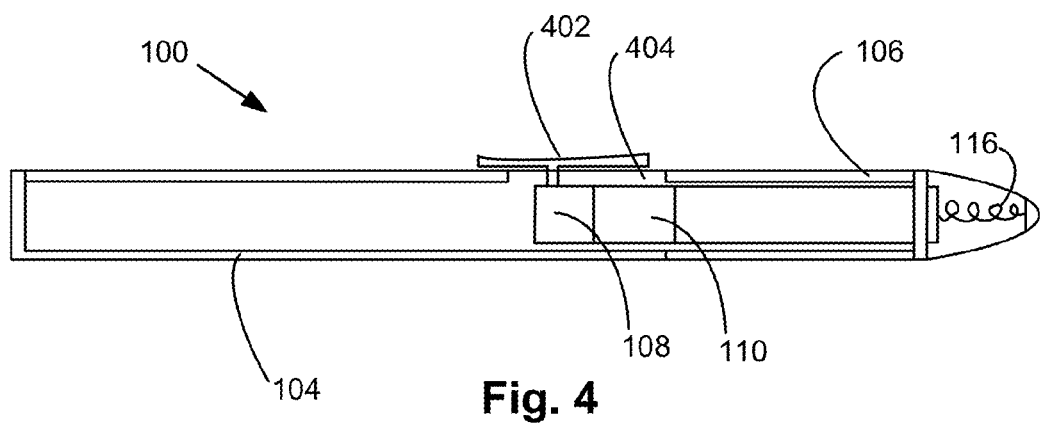
FIG. 4 illustrates a cross sectional view of a fourth embodiment of a stylus.

In embodiments, the mechanism to move the moveable element between a first and second position is a sliding mechanism. FIG. 4 illustrates an embodiment with a slider 402 located on the exterior portion of the housing 102 and operably coupled to the moveable element 108 to cause it to move within the housing. A sliding mechanism may include a track 404 that guides the slider 402 and the moveable element 108 between a first and second position. In embodiments, the mechanism may include a twisting mechanism wherein a portion of the housing or an external element is rotated to cause movement of the moveable element. In embodiments, a second housing portion or a third housing portion is rotatable relative to another housing portion around the longitudinal axis of the stylus to cause movement of a moveable element.

In the embodiment shown in FIG. 1A-1C, the push button 112 acts as a user interface. In embodiments, the stylus may have multiple user interfaces to manipulate a single moveable element, or multiple user interfaces to manipulate multiple moveable elements in a stylus. Each user interface and moveable element provides the stylus with additional functionality by giving the stylus additional variable detectable properties. By appropriate programming of the motion capture system, application, or combinations thereof, additional reflectivity of the stylus can be translated into an input variable not otherwise readily discernible by the system. For example, a virtual pressure can be inferred from the amount of reflectivity corresponding to the degree in which the user actuates the user interface portion e.g., button 112. In embodiments, a user interface may include a deformable portion of the housing that is operably coupled to the mechanism, for example, the housing includes a rubber portion covering a push button, wherein depressing the rubber portion presses the push button. Such an embodiment would protect the internal mechanisms from outside debris and liquid. In embodiments, the push button may be integral to the housing and be formed as a deformable portion of the housing.

In the embodiment shown in FIG. 1A-1C, the stylus includes a closed tip 120. In embodiments, the close tip includes a capacitive tip for use on capacitive touchscreens. The tip may be made of a material suitable for use with other types of touchscreens. In embodiments, the closed tip includes a laser diode or a lighting device to be used as a flashlight or laser pointer. The stylus may include an end that includes a pen, marker, or other writing implement. In embodiments, the stylus includes two ends each with a feature outlined above.

In embodiments, a motion capture device detects a reflective property of a portion of a stylus. The embodiment of the stylus 100 shown in FIG. 1A-1C includes a second housing portion 106 that is made of a transparent material, and a first housing portion 104 made of an opaque material. The moveable element 108 is located in a first position shown in FIG. 1A where the reflector 110 is substantially in the first housing portion and the reflectivity of the reflector would not contribute to a reflectivity measurement of the second portion of the housing by a motion capture device since the reflector is located within an opaque portion of the housing. When the moveable element 108 is in the second housing portion 106, the reflector 110 is substantially in the second housing portion 106, as shown in FIG. 1C, and a reflectivity measurement of the second portion of the housing taken by a motion capture device is affected by the presence of the reflector 110 within the transparent second housing portion 106. In embodiments, the reflectivity exhibited by the second portion of the housing will be variable between a first position and a second position depending on the position of the moveable element which is controlled by the mechanism and user interface. In embodiments, the position of the moveable element alters a reflective property of a stylus and therefore by controlling the position of the moveable element a user alters a detected property of the stylus which gives the stylus additional functionality.

A motion capture device detects reflective patterns either on the reflector or another reflective surface of a stylus. In embodiments, the detected patterns are recognized by an application as signaling execution of a function or a command, or to uniquely identify the stylus.

In embodiments, a stylus includes a reflective pattern, or multiple reflective patterns, that are visible from different orientations of the stylus relative to a motion capture device. An application is able to determine the orientation of a stylus based on the detected patterns of the stylus. An application may assign different functions to the same stylus performing the same movements based on the orientation of the stylus, therefore giving the stylus additional functionality.

In embodiments, a stylus, a motion capture device, and an application executed on a computer are used in a system to assign different functions dependent on any combination of a detected movement of the stylus, a detected orientation of the stylus, and a detected reflective property exhibited by one or more portions of the stylus. For example, in a drawing or painting application the detected reflective property of the second housing portion 106 of the stylus 100 shown in FIG. 1A-1C correlates to the brush or stroke pressure. In this example of a user wanting to draw a light stroke applies little or no pressure to the push button 112 and moves the stylus 100 in the 3-dimension sensing region above the motion capture device corresponding to where they want the light stroke on a computer screen in the system. To paint with a heavier brush stroke the user applies more pressure to the push button 112 to change the exhibited reflective property of the second housing portion 106 which is detected by the motion capture device and is used as an input signal to change the function of the stylus to a heavier stroke. In this example, the stylus is able to exhibit a plurality of reflective properties which correspond to a plurality of brush stroke pressures. While this example illustrates a specific use of a system according to the technology disclosed it will be understood by those of skill in the art that other applications can also a system including a stylus with additional functionality.

In embodiments, a stylus includes one or more reflective surfaces on an exterior surface of the stylus. During operation a user physically blocks all of or a portion of a reflective surface, for example, by moving a finger so that the fingertip entirely covers a reflective surface. In the embodiment shown in FIG. 3, during operation a user could selectively move a finger to cover or uncover portions of reflective surface 304. A motion capture device detects a change in a reflective property of a portion of the stylus based on a user covering the reflective portion. Similar to mechanical embodiments, an application will execute different functions based on different detected reflective properties that are changed based on a user selectively covering portions of a stylus. In embodiments, a motion capture device detects changes in a reflective property of portions of a stylus due to any combination of the above describes methods.

While the disclosed technology is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the invention and the scope of the following claims.

What is claimed is:
1. A multi-functional stylus comprising:
   a housing comprising;
      a first hollow portion; and
      a second hollow portion;
   a reflector within said housing comprising a highly reflective surface; and
   a moveable element operably coupled within said housing to be moveable between a first position substantially within said first hollow portion and a second position at least partially within said second hollow portion;
   wherein a portion of said second hollow portion of the housing exhibits a first reflective property when said moveable element is in said first position and a second reflective property different than the first reflective property when said moveable element is in said second position.

2. The multi-functional stylus of claim 1,
   wherein said first hollow portion comprises walls having a first opacity; and
   wherein said second hollow portion comprises walls having a second opacity less than the first opacity.

3. The multi-functional stylus of claim 2, wherein said walls of said first hollow portion are substantially opaque; and
   wherein said walls of said second hollow portion are substantially transparent.

4. The multi-functional stylus of claim 1,
   wherein said first reflective property is lower than said second reflective property.

5. The multi-functional stylus of claim 1, wherein said first reflective property is higher than said second reflective property.

6. The multi-functional stylus of claim 1, further comprising a biasing device operably coupled to the moveable element and the housing;
wherein the biasing device exerts a force on the moveable element relative to the housing toward a neutral position when the moveable element is not located at the neutral position.

7. The multi-functional stylus of claim 6, further comprising a power transmission mechanism operably coupled to the housing and the moveable element comprising:
a user interface element comprising a portion exterior to said housing;
wherein a movement of user interface element causes said moveable element to move within said housing.

8. The multi-functional stylus of claim 7, wherein said portion of user interface element exterior to said housing is located proximal to the portion of said second hollow portion of the housing exhibiting a first reflective property when said moveable element is in said first position.

9. The multi-functional stylus of claim 8, wherein said user interface element is a push button; and wherein depression of said push button toward interior of said housing causes the moveable element to move within said housing between said first position and said second position.

10. The multifunctional stylus of claim 9, wherein the housing has an axial direction along a length of said housing; and
wherein depression of said push button causes the push button to move in a direction substantially perpendicular to the axial direction of said housing.

11. The multifunctional stylus of claim 10, wherein said push button interfaces with an inclined plane operably coupled to said moveable element; and
wherein depression of said push button causes a force to be transferred from said push button to said inclined plane causing translation of the inclined plane;
wherein translation of said incline plane causes movement of said moveable element within said housing.

12. The multi-functional stylus of claim 7, wherein said user interface element is a slider located on an exterior portion of the housing operably coupled to said moveable element; and
wherein movement of the slider causes movement of the moveable element within the housing between said first position and said second position.

13. The multi-functional stylus of claim 1, further comprising a power transmission mechanism operably coupled to the housing and the moveable element wherein a twisting motion of a portion of the housing causes the power transmission mechanism to move said moveable element from said first position to said second position.

14. The multi-functional stylus of claim 1, wherein the housing is substantially cylindrical in shape including an end portion adjacent to the second hollow portion; and
wherein said end portion prevents any portion of said moveable element from moving to a position exterior to said housing.

15. The multi-functional stylus of claim 1, wherein said reflector is fixed in location relative to said housing.

16. The multi-functional stylus of claim 1, wherein said reflector is operably coupled to said moveable element and is moveable within said housing.

17. The multi-functional stylus of claim 1, wherein the reflectivity of the reflector is at least 90% for infrared radiation.

18. The multi-functional stylus of claim 1, wherein said reflector includes portions with different reflectivity.

19. The multi-functional stylus of claim 1, wherein said reflector includes at least a portion with a pattern of different reflectivities.

20. The multi-functional stylus of claim 1, wherein an exterior portion of said housing has a reflectivity substantially similar to a reflectivity of said reflector.

21. The multi-functional stylus of claim 1, wherein the reflector is a retro-reflector.

22. A computer interface system including:
the multi-functional stylus of claim 1, and
a motion sensing device capable of detecting said first reflective property and said second reflective property of said stylus.

23. The computer interface system of claim 22, wherein the stylus is used as an input device and different functions are assigned to different reflective properties of said stylus.

* * * * *